No. 767,756. PATENTED AUG. 16, 1904.
J. N. HORNBLOWER.
ELASTIC TREAD ATTACHMENT FOR HORSESHOES.
APPLICATION FILED NOV. 16, 1903.
NO MODEL.
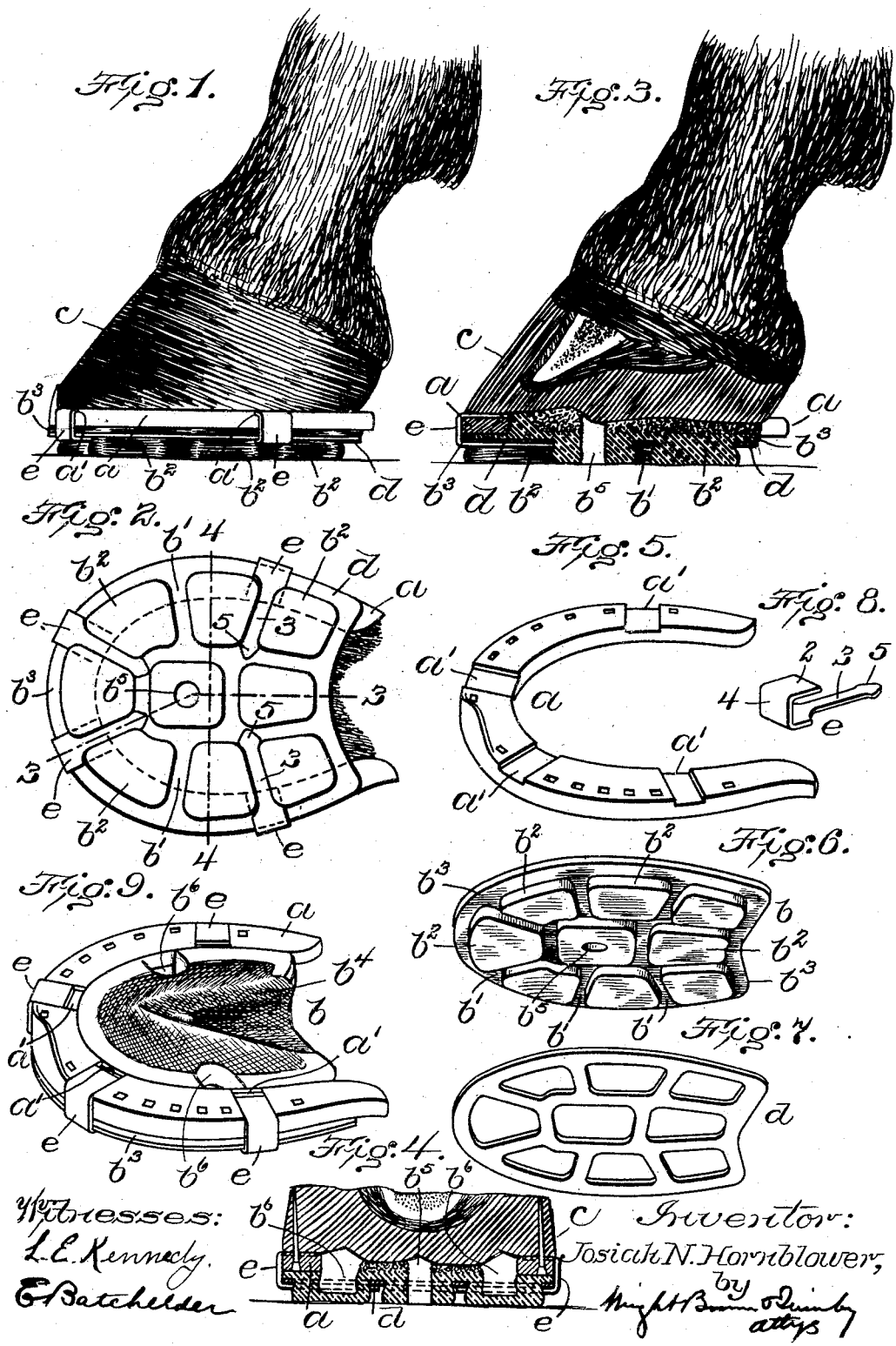
Witnesses:
L. E. Kennedy.
G. F. Batchelder.
Inventor:
Josiah N. Hornblower,
by Wright Brown & Quinby
attys No. 767,756.  
Patented August 16, 1904.

UNITED STATES PATENT OFFICE.

JOSIAH N. HORNBLOWER, OF ELIZABETH, NEW JERSEY.

ELASTIC-TREAD ATTACHMENT FOR HORSESHOES.

SPECIFICATION forming part of Letters Patent No. 767,756, dated August 16, 1904.

Application filed November 16, 1903. Serial No. 181,291. (No model.)

*To all whom it may concern:*

Be it known that I, JOSIAH N. HORNBLOWER, of Elizabeth, in the county of Union and State of New Jersey, have invented certain new and useful Improvements in Elastic-Tread Attachments for Horseshoes, of which the following is a specification.

This invention has for its object to provide an elastic tread adapted to be quickly and conveniently attached to and removed from a shoe on a horse's hoofs to prevent slipping and to relieve the hoof from the usual shocks and jars which attend the contact of the shoe with a hard pavement, the particular object being to enable the elastic tread to be applied and removed by a stableman or groom without the services of a skilled farrier and so conveniently that it will be practicable to remove the tread when its use is not required, as when the horse is standing in the stable or traveling on surfaces that do not render an elastic cushion necessary or desirable, and to apply the shoe when the conditions are such as to warrant its use.

The invention also has for its object to provide an improved horseshoe adapted for use in connection with an elastic-tread attachment which is detachable from the shoe, the latter remaining in place on the hoof.

The invention consists in the improvements which I will now proceed to describe and claim.

Of the accompanying drawings, forming a part of this specification, Figure 1 represents a side view of a hoof having a shoe and a tread attachment embodying my invention. Fig. 2 represents a bottom view of the same. Fig. 3 represents a section on line 3 3 of Fig. 2. Fig. 4 represents a section on line 4 4 of Fig. 2. Fig. 5 represents a perspective view of the shoe detached. Fig. 6 represents a perspective view of the elastic tread detached. Fig. 7 represents a perspective view of the grating which supports the elastic tread. Fig. 8 represents a perspective view of one of the clamps which unite the tread and grating to the shoe. Fig. 9 represents a perspective view showing the shoe, the elastic tread, and the grating connected for use.

The same reference characters indicate the same parts in all the figures.

In the drawings, $a$ represents a horseshoe having in its upper or hoof-bearing surface a series of transverse depressions $a'$ which characterize my improved shoe, the shoe being otherwise of any suitable form and construction.

$b$ represents an elastic cushion, composed, preferably, of vulcanized rubber. Said cushion is formed to bear on the under surface of the hoof $c$ between the arms of the shoe and to project downwardly below the bottom or tread-surface of the shoe, the downwardly-projecting portion being subdivided by channels $b'$ into a series of tread projections $b^2$. The marginal portion of the cushion is formed as a relatively-thin flange $b^3$, which projects under and covers the tread-surface of the shoe. The upper portion of the cushion, which occupies the space between the arms of the shoe, is preferably formed to accurately fit the frog of the hoof and is preferably made of cellular or sponge rubber, the cellular portion $b^4$ being distinguished by dots in Figs. 3 and 4. This portion may be originally formed in a separate piece and united to the lower or body portion of the cushion by vulcanization or otherwise. The cellular portion presents a soft and yielding surface to the bottom of the hoof.

$d$ represents a grating formed to occupy the channels $b'$ in the cushion, the bars of the grating surrounding openings formed to receive the projections $b^2$ on the lower portion of the cushion. The grating $d$ may be conveniently made of sheet metal formed as a skeleton plate and has a continuous marginal portion, which is preferably formed to cover the under side of the marginal flange of the cushion, and therefore to project under the tread-surface of the shoe.

$e\ e$ represent a series of U-shaped clamps, each having an upper arm 2, formed to enter one of the depressions $a'$ in the upper side of the shoe, a lower arm 3, formed to enter the space $b'$ between two adjacent projections $b^2$ and bear on the under side of the grating $d$, and a connecting-neck 4, which extends across the outer edges of the shoe, the cushion, and the grating. The arm 3 is provided with a head or enlargement 5 at its end, which engages the inner sides of two adjacent projections $b^2$ and prevents the clamp from slipping loosely outward, the elastic projections exerting a hold on the head which is sufficient to require the application of force to withdraw the clamp.

When the shoe is attached to the hoof, the depressions $a'$ form the lower sides and edges of narrow slots, the upper sides of which are formed by the bottom of the hoof. When the cushion is applied to the bottom of the hoof and shoe, it is secured by engaging the grating with the channels of the cushion and then applying the clamps, the upper arms of which are forced into the depressions in the top of the shoe, while their lower arms are forced into channels between corresponding pairs of projections $b^2$, said lower arms bearing against the under side of the grating and holding the grating and the cushion against the bottom of the hoof and shoe. It will be seen that the portions of the cushion that present the tread-faces extend continuously from said faces to the bottom of the hoof between the arms of the shoe. Hence said portions constitute elastic buffers which effectively absorb shocks and jars and prevent their transmission to the hoof. At the same time the elastic tread-faces projecting below the tread-surface of the shoe reduce to the minimum the liability of slipping on a smooth or wet pavement. The cushion may be quickly detached by removing the clamps $e$. This operation, as well as the operation of applying the clamps to secure the cushion, can be conveniently and quickly performed without the use of special tools other than a pair of nippers or the like by a stableman or groom. The cushion may therefore be quickly applied in the stable before the horse is taken out and removed after the return of the horse to the stable.

The portion $b^4$ of the cushion is preferably adapted to absorb water and hold it in contact with the bottom of the hoof, it being well known that a horse's hoof is benefited by moisture. If the portion $b^4$ is made of sponge-rubber, as hereinbefore indicated, its structure should be such as to enable water to permeate all portions of the said portion and to have access to the bottom of the hoof. I prefer to provide the waterproof tread or body portion of the cushion with one or more orifices $b^5$, extending from the tread-surface to the absorbent portion $b^4$, said orifice or orifices admitting water to the absorbent portion. If desired, the absorbent portion $b^4$ may be detachable from the body portion of the cushion, so that when the tread-surfaces have been worn out the body portion may be removed and a new one substituted, the absorbent portion $b^4$, which is not subjected to wear, being retained. In this case the portion $b^4$ may be made of felt or of any other absorbent material other than rubber, or it may be made of a piece of sponge-rubber detachable from the body portion of the cushion.

It will be observed that the grating $d$ is not subjected to wear and can therefore be used to confine an indefinite number of cushions, the worn cushions being discarded and new ones substituted, all being held by the same grating.

The projections $b^2$ of the cushion may be made hollow, if desired, to decrease the weight of the cushion. In Fig. 4 I show a hollow or cavity $b^6$ formed in two of the projections $b^2$.

I claim—

1. An attachment for horseshoes, comprising an elastic cushion formed to support the bottom of a hoof and extend over the space between the arms of and project below the tread-face of the shoe, forming an elastic tread, and a grating formed to extend across the cushion and to be detachably embedded therein and expose portions thereof, and means for detachably securing the marginal portion of said grating to the shoe.

2. An attachment for horseshoes comprising an elastic cushion formed to bear on the bottom of a hoof between the arms of a shoe, said cushion having tread projections on its under side separated by channels in the cushion and formed to project below the tread-surface of the shoe, a grating formed to occupy said channels, and means for detachably connecting said grating with the shoe.

3. An attachment for horseshoes, comprising an elastic cushion formed to bear on the bottom of a hoof between the arms of a shoe and on the tread-surface of the shoe, said cushion having tread projections on its under side separated by channels in the cushion and formed to project below the tread-surface of the shoe, a grating formed to occupy said channels and to project under the tread-surface of the shoe, and means for detachably connecting said grating with the shoe.

4. An attachment for horseshoes, comprising an elastic cushion formed to bear on the bottom of a hoof between the arms of a shoe, said cushion having tread projections on its under side separated by channels in the bottom of the cushion and formed to project below the shoe, a grating formed to occupy the said channels and to project under the tread-surface of the shoe, and U-shaped clamps formed to enter channels in the cushion and to engage the under side of the grating and the upper side of the shoe.

5. An attachment for horseshoes, comprising an elastic cushion formed to bear on the bottom of a hoof between the arms of a shoe, said cushion having tread projections on its under side separated by channels in the bottom of the cushion and formed to project below the shoe, a grating formed to occupy the said channels and to project under the tread-surface of the shoe, and U-shaped clamps formed to enter channels in the cushion and to engage the under side of the grating and the upper side of the shoe, the said clamps having heads or enlargements at the ends of their lower arms to engage the inner portions of adjacent tread projections.

6. An attachment for horseshoes, comprising an elastic cushion formed to bear on the bottom of a hoof between the arms of a shoe and on the tread-surface of the shoe, said cushion having tread projections on its under side separated by channels in the bottom of the cushion and formed to project below the shoe, a grating formed to occupy the said channels and to project under the tread-surface of the shoe, and U-shaped clamps formed to enter channels in the cushion and to engage the under side of the grating and the upper side of the shoe.

7. As an article of manufacture, an elastic pad or cushion formed to bear on the bottom of a hoof between the arms of a horseshoe and to project below the bottom of the shoe, said cushion having tread-sections separated by channels which are adapted to receive attaching means.

In testimony whereof I have affixed my signature in presence of two witnesses.

JOSIAH N. HORNBLOWER.

Witnesses:
C. F. BROWN,
E. BATCHELDER.